United States
Paris et al.

[11] 3,994,155
[45] Nov. 30, 1976

[54] DEVISE FOR THE MEASUREMENT OF MECHANICAL VIBRATIONS

[75] Inventors: Marcel Paris, Manosque; Serge Poinsot, Pertuis, both of France

[73] Assignee: Commissariat a l'Energie Atomique, Paris, France

[22] Filed: Mar. 13, 1975

[21] Appl. No.: 558,150

[30] Foreign Application Priority Data
Mar. 19, 1974 France ............... 74.09310

[52] U.S. Cl. .............. 73/71.2; 73/516 LM
[51] Int. Cl.² ............... G01H 11/00; G01P 15/08
[58] Field of Search ............ 73/71.2, 71.4, 516 LM, 73/194 EM

[56] References Cited
UNITED STATES PATENTS

| | | | |
|---|---|---|---|
| 3,008,334 | 11/1961 | Lees | 73/516 LM X |
| 3,406,569 | 10/1968 | Rohmann | 73/194 EM |
| 3,839,904 | 10/1974 | Stripling et al. | 73/71.2 |
| 3,906,802 | 9/1975 | Nonaki | 73/516 LM |

*Primary Examiner*—Richard C. Queisser
*Assistant Examiner*—John P. Beauchamp
*Attorney, Agent, or Firm*—McNenny, Pearne, Gordon, Gail, Dickinson & Schiller

[57] ABSTRACT

A vibrating mass consisting of an electrically conductive liquid is capable of alternate motion in two opposite directions within a narrowed section of a leaktight vessel placed in a medium in which vibrations are to be measured. The speed of motion of the conductive liquid within the narrowed section generates a voltage which is proportional to the frequency and amplitude of the mechanical vibrations.

2 Claims, 7 Drawing Figures

DEVISE FOR THE MEASUREMENT OF MECHANICAL VIBRATIONS

This invention relates to a device for measuring mechanical vibrations.

Said device proves particularly useful for all applications in which the measurement is to be performed in a medium which is at high temperature, which is not readily accessible and in which it is essential for the reason just mentioned to ensure that the measuring instruments can operate over very long periods of time without requiring maintenance or servicing. The foregoing conditions are encountered especially in nuclear reactors in which it is very useful to be able to detect vibrations with instruments which are reliable and capable of operating in situ over a period of many years.

Known instruments of this type include the piezoelectric devices, the electromechanical diaphragm-type devices, inductive or capacitive transducers, and strain gauges. All these devices can prove satisfactory for measuring vibrations under certain conditions but are no longer suitable when it proves necessary to measure low-frequency vibrations at high temperature and during long periods of time.

The present invention relates to a device which satisfies the conditions outlined in the foregoing and makes it possible in particular to measure vibrations within the range of 0 to 50 cps approximately with accelerations ranging from $10^{-2}$ to $10^{-3}$ g.

The device comprises:

a hermetically sealed vessel provided with a central opening which delimits within the interior of said vessel channels which communicate with each other and one of which has a narrowed section, an electrically conductive liquid which is contained within the channels and the level of which is maintained below the top portion of the opening in order to ensure that the communication between the vertical channels takes place solely through one of the channels which is placed horizontally in the base of the vessel, means for producing a magnetic field within the narrowed section and means for measuring the voltage generated by the speed of displacement of the liquid within the narrowed section.

In one embodiment, the means for producing a magnetic field comprise a magnet whose poles are located on each side of the narrowed section formed by the horizontal channel, the direction defined by the poles being perpendicular to the direction of displacement of the liquid within the narrowed section, the means for measuring said voltage being constituted by two electrodes placed on each side of the narrowed section in a direction at right angles both to the direction of the poles and to the direction of displacement of the liquid.

In another embodiment, the means for producing a magnetic field comprise a permanent magnet whose poles are located on each side of the narrowed section formed by one of the vertical channels, the direction defined by the poles being perpendicular to the direction of displacement of the liquid within the narrowed section, the means for measuring said voltage being constituted by two electrodes placed on each side of the narrowed section in a direction at right angles both to the direction of the poles and to the direction of displacement of the liquid.

The means for producing a magnetic field comprise a magnet constituted by an electromagnet. Said electromagnet can operate either with direct current or with high-frequency alternating current.

In a further embodiment, the means for producing a magnetic field comprise a primary winding supplied with alternating current of constant amplitude and frequency which is placed in the central portion of a tubular coil form surrounding the exterior of the narrowed section formed by one of the channels of the vessel in a direction parallel to its axis, the means for measuring said voltage being constituted by identical secondary windings disposed on each side of the primary winding and connected in opposition.

In this case, the narrowed section is formed by one of the channels disposed horizontally in the base of the vessel. The narrowed section can also be formed by one of the channels which is disposed vertically within the vessel.

A more complete understanding of the invention will be obtained from the following examples of construction which are given by way of illustration but not in any limiting sense, reference being made to the accompanying drawings in which.

Figure 1:
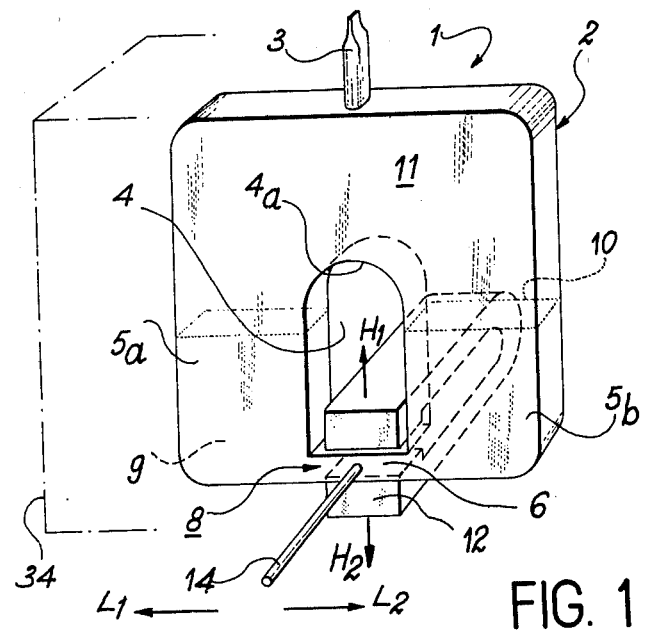
FIG. 1 is a diagrammatic view in perspective showing one embodiment corresponding to the first variant of the method.

The device shown in FIG. 1 is generally designated by the reference numeral 1 and comprises a vessel 2 of stainless steel for example and closed by a filler-tube 3, said vessel being provided with an opening 4 in an approximately central region. Said opening 4 delimits two vertical channels 5a, 5b of identical section which communicate with each other by means of a horizontal channel 6 comprising a narrowed section 8; the relative dimensions of the common section of the channels 5a, 5b and of the narrowed section 8 are such as to produce at low frequencies a velocity of displacement of the liquid which is sufficient to collect a usable signal.

The conductive liquid advantageously consists of sodium or of a sodium-potassium alloy if it is desired to measure vibrations resulting for example from the circulation of sodium employed as coolant in a nuclear reactor of the fast-neutron type.

The vessel 2 is filled with sodium 9 for example, up to a level 10 located below the top portion 4a of the opening 4 so as to ensure that the vertical channels 5a, 5b can communicate with each other only through the horizontal channel 6 and therefore through the narrowed section 8. Since the device 1 is designed to operate in situ within a nuclear reactor for a period of many years, it is an advantage to ensure that the free internal space 11 above the level 10 of sodium 9 is filled with an inert gas such as argon so as to remove any danger of corrosion of the vessel 2 and/or oxidation of the sodium 9 (which might disturb the measurements and result in clogging of the section 8).

Filling of the vessel 2 with sodium and with argon is carried out by means of a filler-tube 3 which is subsequently sealed-off.

In a first embodiment, a magnet 12 is placed on each side of the section 8 and produces a magnetic field which is represented in the figure by the arrows $H_1$ and $H_2$, said field being vertical and consequently perpendicular to the alternating horizontal displacement of the sodium 9 within the section 8 (arrows $L_1$ and $L_2$) under the influence of the vibrations of the vessel 2.

The voltage produced by the displacement of the electrically conductive liquid in the magnetic field in the direction of the arrows $H_1$ and $H_2$ is collected on two electrodes as designated by the reference numeral 14 (only one electrode being shown in FIG. 1). Said electrodes are placed in diagrammatically opposite relation and at right angles both to the direction of the magnetic field ($H_1$, $H_2$) and to the direction of the displacement of the liquid ($L_1$, $L_2$). Said electrodes 14 are welded to the opposite walls of the vessel 2.

The sinusoidal voltage collected at said electrodes 14 can be processed by conventional electronic means so as to obtain either a curve which is visualized or recorded on a screen, or numerical values.

After preliminary calibration of the device, it is thus possible to measure the frequency, the amplitude and, if so desired, the acceleration of vibrations.

Figure 2:
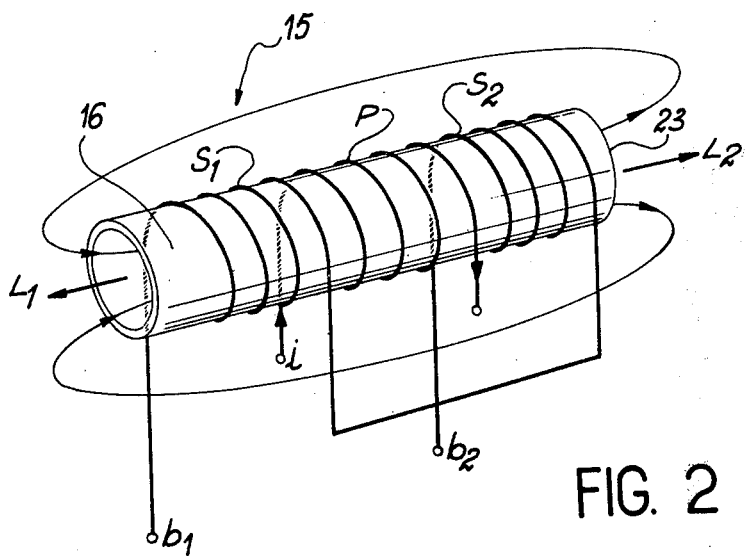
FIG. 2 is a diagrammatic view in perspective showing the tubular coil form which is provided with windings and employed in the second variant of the method.
Figure 3A:
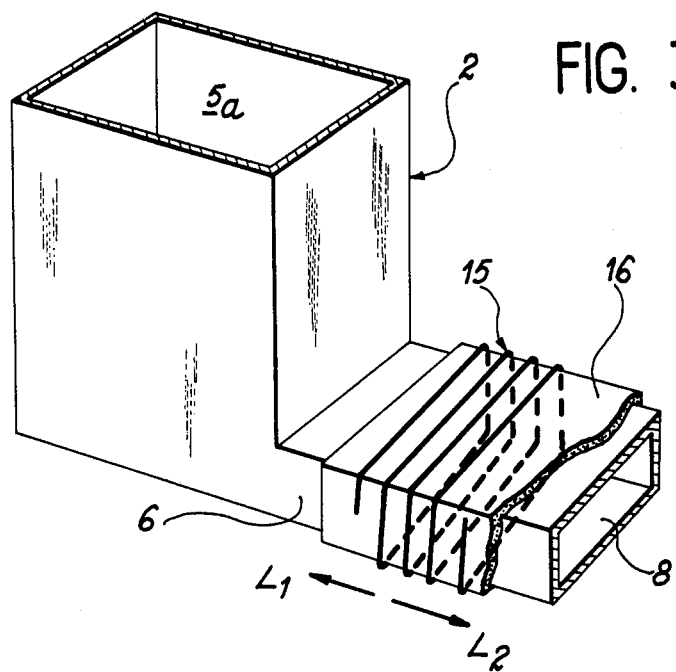
FIGS. 3a and 3b are partial views in perspective corresponding to embodiments of the invention.

There is shown in FIG. 2 a coil unit 15 corresponding to the practical application of the second variant of the method. This device makes use of a tubular form 16 fitted with windings P and $S_1$, $S_2$. The central portion of the form 16 receives the primary winding P which is supplied with a current i of constant frequency and amplitude. The two identical secondary windings $S_1$ and $S_2$ are mounted in opposition and symmetrically on each side of the primary winding P. In a first embodiment (FIG. 3a) of this variant of the method, the coil form 16 is placed externally around the entire narrowed section 8 of the horizontal channel 6. To this end, said channel must accordingly have a suitable length and the displacements of the sodium take place alternately in the directions of the arrows $L_1$ and $L_2$.

When there is no circulation of sodium within the section 8, the eddy currents developed within the sodium are symmetrical with respect to the windings and the voltages delivered by the two identical secondary windings mounted in opposition are of equal value and their difference is consequently zero.

In the presence of vibrations, the sodium is displaced alternately in the directions of the arrows $L_1$ and $L_2$ and the voltages within the two secondary windings are no longer equal.

In the direction of displacement indicated by the arrow $L_2$, a voltage $-(e - \Delta e)$ is developed at the terminals of the winding $S_1$ and a voltage $e + \Delta e$ is developed at the terminals of the winding $S_2$, there being accordingly obtained between the terminals $b_1$ and $b_2$ a voltage equal to:

$$-(e - \Delta e) + (e + \Delta e) = +2 \Delta e$$

At the time of displacement of the sodium in the opposite direction $L_1$, there is developed between the terminals $b_1$ and $b_2$ a voltage equal to:

$$-(e + \Delta e) + (e - \Delta e) = -2 \Delta e.$$

As in the first variant of the method illustrated in FIG. 1, a preliminary calibration of the device makes it possible to determine the frequency and/or the amplitude of vibrations from the measured voltage.

Figure 3B:
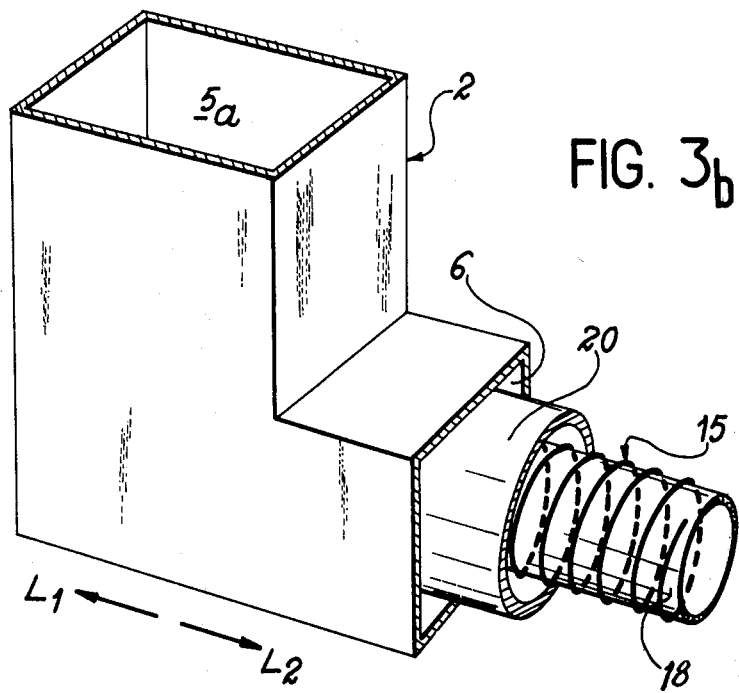
Figure 4:
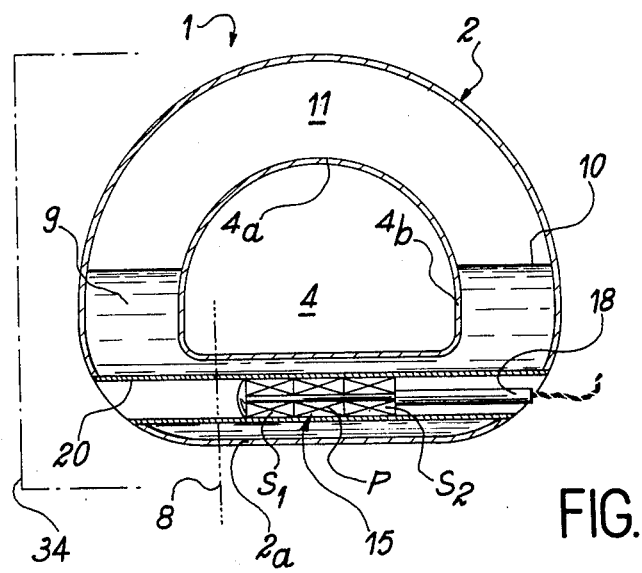
FIG. 4 is a diagrammatic vertical sectional view corresponding to one embodiment of the second variant of the method.
Figure 5:
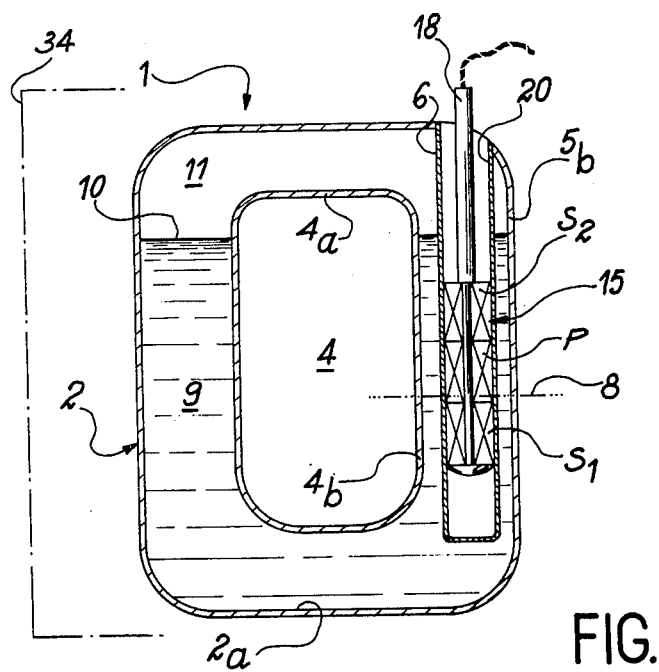
FIG. 5 is a diagrammatic vertical sectional view corresponding to another embodiment of the second variant of the method.

FIGS. 3b, 4 and 5 illustrate two further embodiments in which the coil unit 15 is introduced within the interior of the vibrating mass consisting of sodium in motion instead of externally with respect to this latter. In these two embodiments, the coil unit 15 which is rigidly fixed to a rod 18 is introduced within a guide tube 20 or so-called glove finger which is stationarily fixed in leak-tight manner within one channel of the vessel 2 (namely the channel 6 or 5a or 5b). The coil unit 15 can thus be easily reached if necessary and can be withdrawn from its service position or put back in position after inspection or repair without any interruption of leak-tightness.

In FIGS. 3b and 4, there is shown a glove finger 20 which is placed concentrically within the interior of the horizontal channel 6 of the vessel 2, the narrowed section 8 being in that case constituted by the annular space provided around the glove finger 20 and delimited by the wall of the channel 2a which is disposed horizontally. The vibrating mass is constituted by sodium 9, the top level 10 of which is located below the level 4a of the upper portion of the opening 4. The free internal space 11 above the level 10 is filled with argon.

In FIG. 5, the glove finger 20 is placed in a vertical position within the interior of the channel 5b, the narrowed section 8 being constituted by the annular space located around the glove finger 20 and delimited by the vertical wall 4b of the opening 4 and by the vertical walls of the vessel 2 (channel 5b). Otherwise the arrangements are the same as in FIG. 4 and accordingly consist of the coil unit 15 which is placed within the interior of the glove finger and fitted with an operating rod 18, the vibrating mass of sodium 9 whose top level 10 is located below the level of the top portion 4a of the opening 4, the free internal space 11 which is filled with argon.

In both these embodiments, the principle of operation is identical with that of the first embodiment and accordingly consists in determining the frequency and/or the amplitude of vibrations by measuring the differential voltage between the terminals of the secondary windings $S_1$ and $S_2$.

Figure 6:
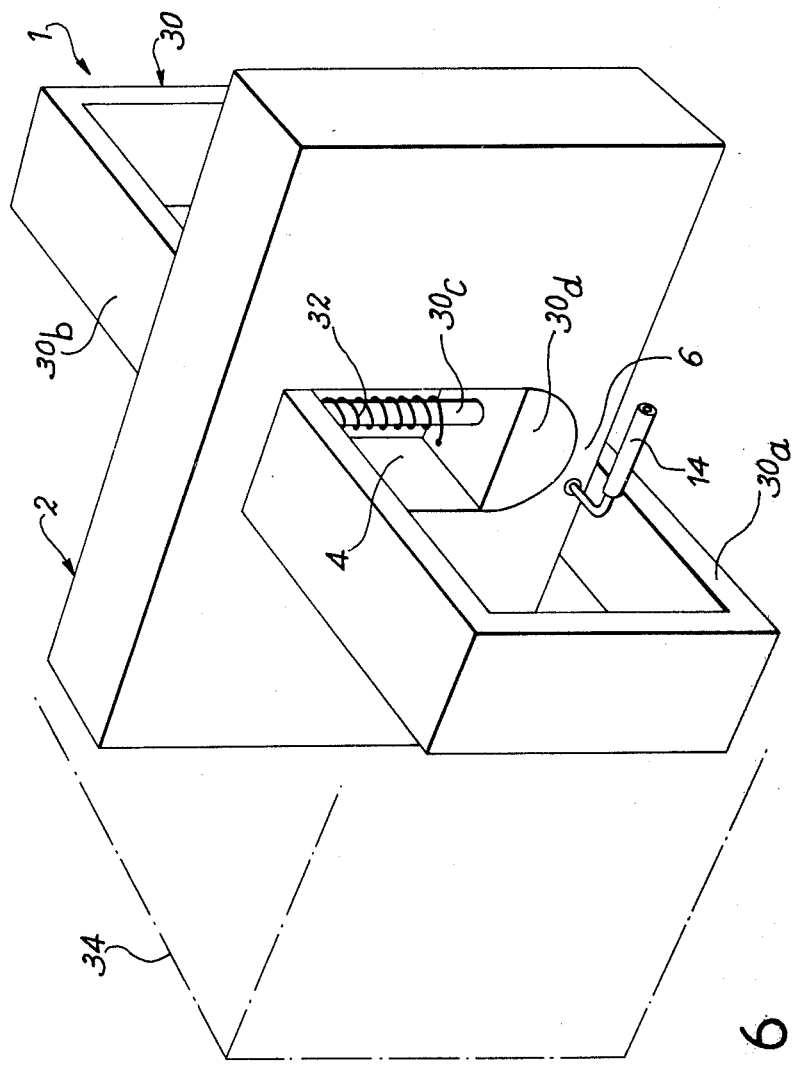
FIG. 6 illustrates a particularly advantageous form of construction of the measuring device in accordance with the invention.

The diagram of FIG. 6 corresponds to one advantageous form of construction of the device 1 of FIG. 1 when the magnet 12 is replaced by an electromagnet.

In this case, a magnetic frame 30 is disposed at right angles to the lateral faces of the vessel 2. One arm 30a of the frame 30 is placed beneath the horizontal channel 6 whilst the other arm 30b passes within the opening 4. A magnetic core 30c which is centered within the opening 4 connects the arm 30b to a pole-piece 30d which is placed against the top wall of the channel 6 so that this latter is placed within the air-gap of the magnetic circuit of the frame 30.

A winding 32 which is partially illustrated in FIG. 6 is placed on the core 30c so as to constitute an electromagnet with the magnetic frame 30.

The electrodes 14, only one of which is visible in FIG. 6, are disposed symmetrically on each side of the lateral faces of the channel 6.

The complete measuring device 1 is placed within a leak-tight casing 34 in order to permit the measurement of vibrations in a position in which said casing is immersed in a primary reactor coolant such as sodium, for example. The electrical leads to the electrodes 14 and the winding 32 are thus protected from direct contact with the sodium. The cables (not shown) which are connected to said leads pass through seals provided in the casing and are taken out to the exterior of the reactor by conventional methods.

It is readily apparent that the vibration pickup 1 is rigidly fixed to the casing 34 by suitable means known per se such as braces, tie-rods and so forth so as to constitute a rigid assembly which is capable of withstanding vibrations.

The casing 34 is shown diagrammatically in chain-dotted outline in FIGS. 1, 4 and 5.

The devices which are shown in the figures and are employed for the application of the two variants of the method according to the invention all have the following advantages in common: they are not sensitive to transverse vibrations and, in addition, their operation is not disturbed by an inclination of several degrees with respect to the horizontal.

It will appear self-evident that the invention is not limited to the examples of construction which have been more especially described with reference to the accompanying drawings but extends on the contrary to all alternative forms. Thus it should be clearly understood that the geometry and structural design of the device can be adapted both to the application and to the medium which are contemplated. As a consequence, it is possible in particular to select the substances which are best suited in each case to the vessel structure, to the electrically conductive liquid and the gas employed for filling the free internal space as well as to the value of the electromagnetic parameters employed for the measurement.

What we claim is:

1. A device for measuring mechanical vibration comprising a hermetically sealed vessel, said vessel having an interior and being provided with a central opening which delimits within the interior of said vessel channels which communicate with each other and one of which has a narrowed section, an electrically conductive liquid which is contained within the channels and the level of which is maintained below the top portion of the opening in order to ensure that the communication between vertically extending ones of said channels takes place solely through one of the channels which is placed horizontally in the base of the vessel, means for producing a magnetic field within the narrowed section and means for measuring the voltage generated by the speed of displacement of the liquid within the narrowed section, said means for producing a magnetic field comprising a tubular coil form, a primary winding supplied with alternating current of constant amplitude and frequency which is placed on the central portion of the tubular coil form, said coil form surrounding the exterior of the narrowed section formed by one of the channels of the vessel in a direction parallel to its axis, and at least two identical secondary windings disposed on each side of the primary winding and connected in opposition, said secondary windings constituting said means for measuring said voltage.

2. A device for measuring mechanical vibration comprising a hermetically sealed vessel, said vessel having an interior and being provided with a central opening which delimits within the interior of said vessel channels which communicate with each other and one of which has a narrowed section, an electrically conductive liquid which is contained within the channels and the level of which is maintained below the top portion of the opening in order to ensure that the communication between vertically extending ones of said channels takes place solely through one of the channels which is placed horizontally in the base of the vessel, means for producing a magnetic field within the narrowed section and means for measuring the voltage generated by the speed of displacement of the liquid within the narrowed section, said means for producing a magnetic field comprising a tubular coil form, a primary winding supplied with alternating current of constant amplitude and frequency placed on the central portion of the tubular coil form, a glove finger type guide tube said tubular coil form being inserted within the interior of said guide tube, the narrowed section being constituted within the vessel by an annular passageway formed between the external wall of said guide tube and one of the channels of said vessel, and at least two identical secondary windings placed on each side of the primary winding and connected in opposition, said secondary windings constituting said means for measuring said voltage.

* * * * *